United States Patent Office 3,578,523
Patented May 11, 1971

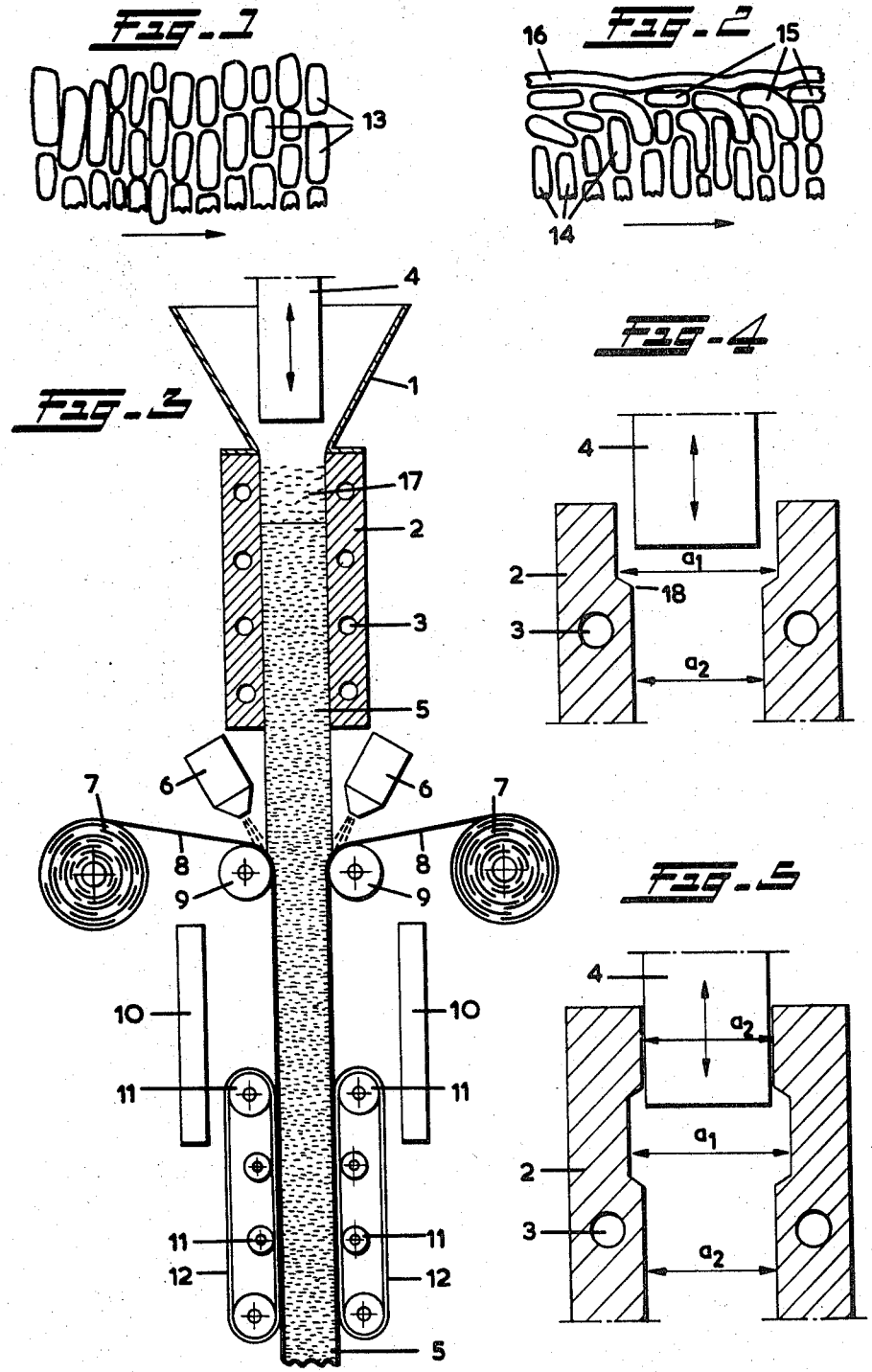

3,578,523
EXTRUSION MOLDING OF PARTICLE BOARD HAVING PARTICULAR SURFACE CHARACTERISTIC
Georg Ohse, Neuenbeken, Paderborn, Germany, assignor to Alfred Graf zu Erbach-Furstenau, Schloss Furstenau, Michelstadt, Germany
Filed May 18, 1967, Ser. No. 639,492
Claims priority, application Germany, May 21, 1966,
E 23,490, E 31,712
Int. Cl. B32b 31/08
U.S. Cl. 156—164                    16 Claims

ABSTRACT OF THE DISCLOSURE

Particled board made by extrusion moulding, in which the chips located adjacent to the surfaces of the board are oriented or bent into a plane substantially parallel to the plane of the board to produce isotropic strength characteristics.

Extrusion moulded particled board has, unlike press moulded particled board, a high strength in the transverse direction, but a poor bending strength, especially in the direction of extrusion. While the swelling of extrusion moulded particled wool board in the direction perpendicular to the plane of the board is very slight, a considerable swelling occurs, upon the absorption of moisture in the direction parallel to the direction of extrusion. These properties of extrusion moulded particled wood board can be attributed to the non-isotropic structure of the board in the plane of the board: the wood particles present in the board are mainly perpendicular to the surface of the board.

Extrusion moulded particled wood board usually is of lower value as far as its uses are concerned than press moulded particled wood board. In order that extrusion moulded particled wood board can also be used in those cases in which severe mechanical requirements are to be met, such board should be provided with an extra layer, for example, it should be veneered. Consequently, additional treaments are required, and this renders the economical use of the extrusion moulding process problematic.

From the journal "Holz als Roh- und Werkstoff," vol. 19 (1961), 480, it is known to spray extrusion moulded particled board on both faces with an adhesive solution, to sprinkle the sprayed faces with thin, plane, white wood chips of a thickness of about 0.2 mm., a length of about 15–20 mm., and a width of about 5 mm., to spray both faces with water, and then to harden the composite sheet in a press for 2–4 minutes at a temperature of 135° C. While this produces sheets of better mechanical and hydraulic properties, the process is expensive and difficult to perform.

I have found that extrusion moulded particled board of wood or like materials, while retaining its excellent physical properties inherent to such board, moreover will acquire the good properties of press-moulded board, of the chips adjacent to the surfaces of the board are disposed substantially parallel to the respective surfaces of the board. Preferably, also, the surface regions of such board should have a higher density than the interior regions. I have further found that the properties of such extrusion moulded particled board can be further improved by covering the board on one or both faces with paper webs of films.

With the above and other objects in view that will hereinafter appear, the nature of the invention will be more clearly understood by reference to the following detailed description, the appended claims and the several views illustrated in the accompanying drawings.

In the drawings:
FIG. 1 is a diagrammatical view on an enlarged scale showing the arrangement of chips in conventional board.
FIG. 2 is a diagrammatical view similar to FIG. 1 and shows the arrangement of chips in board produced in accordance with this invention.
FIG. 3 is a schematic vertical sectional view taken through apparatus for forming board in accordance with this invention.
FIG. 4 is an enlarged fragmentary sectional view taken through the upper part of a modified form of extruder.
FIG. 5 is an enlarged fragmentary sectional view taken through the upper part of still another form of extruder.

FIG. 1 illustrates diagrammatically on an enlarged scale, in a section parallel to the direction of extrusion, indicated by an arrow, the structure of particled wood board made by the conventional extrusion moulding process. It is seen that the individual, elongated chips 13, which are bonded by means of a binder, have their longitudinal axes substantially perpendicular to the direction of extrusion. As a result the surface of the board thus formed is relatively uneven and shows fissures. Such board has a poor bending strength and tensile strength in the direction of extrusion, and swells strongly when exposed to moisture.

FIG. 2 illustrates in like manner the surface of particled wood board made by the extrusion moulding process of the present invention. In the interior region of this board the chips 14, as formerly, have their longitudinal axes extending substantially perpendicular to the direction of extrusion indicated by the arrow. The chips 15 located adjacent to the surfaces of the board, however, extend substantially parallel to the surfaces of the board or are bent into this plane. The bending strength of this board and its tensile strength parallel to the direction of extrusion and also transversely thereof, are considerably improved.

There is further shown in FIG. 2 a paper web or film 16, which may be secured to the surface of the board.

For covering the surface, I preferably use a paper of a high strength, such as the so-called kraft paper. It is recommendable to apply the paper in such a manner that the direction in which the paper runs off the machine coincides with the direction of extrusion of the board. Since the paper has the greatest tensile strength in that direction, this also increases the strength of the board in the direction of extrusion to a greater extent than in the transverse direction. FIG. 2 further shows that the paper web or film 16 may be so applied that it plies itself to all irregularities of the surface of the board, which ensures a highly intimate bond between the paper and the board. With a suitable combination of extrusion moulded board, compression of surface regions and kind of paper, isotropic strength characteristics can be produced, as is the case with press-moulded board.

Instead of paper, I may employ foils of organic, natural or synthetic materials, for example, of cellulose derivatives, polyethylene, polystyrene, polyvinyl chloride, polyamides, polycaprolactams, and the like. Furthermore I may employ foils of inorganic materials for this purpose, for example, metal foils.

In the extrusion moulding of particled board, the chips moistened or coated with a binder are commonly introduced into a funnel disposed over the extruder proper. The binder used is usually a pre-condensed synthetic resin, such as urea-formaldehyde resins, phenol-formaldehyde resins, melamine resins, and the like.

In the extruder, the chips moistened with the binder are agglomerated to form sheets of a structure as shown in FIG. 1, under the impact of the piston or ram. Under the influence of heat and pressure, the chips are firmly bonded together as the binder is further condensed. The sheet issuing from the extruder contains a substantially condensed binder.

For the manufacture of extrusion moulded particled board having a surface structure as shown in FIG. 2, it is achieved, according to the present invention, by virtue of a suitable combination of the temperature of the heating plates, of the chemical composition of the binder, and of the rate of progress through the extruder, that is the residence time of the chips in the heating zone of the extruder, that the board is not yet entirely set and still plastically deformable to a limited extent when leaving the extruder. According to the invention, the sheets of board can be passed between two compression rolls immediately after they leave the extruder. The two compression rolls may be fixedly or resiliently mounted.

In order to promote greater densification of the board at its surfaces, it is recommendable for the extrusion moulded board to be moistened prior to the rolling treatment.

Since the residence time of the sheets between the rolls is relatively short, and the sheets leaving the rolls may still expand, it is in many cases recommendable for the sheets to be passed between one or more subsequent pairs of rolls immediately after they leave the compression rolls. Furthermore, an endless steel band may, on each side of the sheet, be disposed around two or more rolls. Instead of the additional pairs of rolls, I may also employ plane compression members, which may be stationary, but are preferably vibrated to facilitate the passage of the sheets. The additional pairs of rolls or the plane compression members may be heated in view of the ultimate hardening of the calibrated board.

The compression rolls and the subsequent pairs of rolls may be disposed so as to be freely rotatable. In that case they rotate at a peripheral speed which is determined by the rate of speed of the board. However, they may also be positively driven by suitable means, in which case their peripheral speed may be equal to, or different from the rate of transport of the board. If the peripheral speed of the rolls exceeds the rate of transport of the board, the surfaces of the latter will be stretched. There is thus generated a pre-stress in the board between the surface regions and the interior regions. If the peripheral speed of the rolls is lower than the rate of transport of the board, for example, by applying brakes, then the surfaces of the board are upset under pressure, which also generates a pre-stress.

It has further turned out to be of advantage that the chips located adjacent the surfaces of the board need not be oriented in a direction substantially parallel to the surfaces of the board immediately upon its exit from the extruder, but that this may also be effected on an earlier occasion. In this connection it is of importance that the sheet, or the material brought into the shape of a sheet, is suitably treated in heated condition, possibly before the binder has hardened or set. In this connection the inner faces of the heating plates may be provided with projections, optionally in combination with recesses, extending throughout the surface of the plate transversely of the direction of extrusion. As the board moves between the heating plates the chips located adjacent the surfaces of the board will position themselves substantially at right angles to the direction of extrusion. If now the board passes a restricted passage between the plates, the chips, or their outermost portions will be bent or oriented into substantially parallel relationship to the surfaces of the board, as shown in FIG. 2.

It is also possible to use a shorter extruder, of which the plates may also be unheated. The board issuing from the lower end of such an extruder contains practically unhardened or non-set binder, and can, at least at its surfaces, still be easily deformed. If the board is passed between heated compression rolls or compression plates in the condition, the surface in accordance with the present invention is formed and at the same time the binder will set.

The method described may be combined with the simultaneous application of paper webs or films. For this purpose the paper webs or films are fed on one or both sides of the board between the compression rolls and the board which issues from the extruder. The covering is very intimately bonded to the fresh surface of the board. However, it is naturally also possible for the paper webs or films to be bonded to the surface or surfaces of the board through separate rolls, independently of the compression rolls and the re-constitution of the surfaces of the board which they produce.

In order to produce an intimate bonding of the covering with the surface of the board it is recommendable that the faces of the paper webs or films, or the surfaces of the board, or both, be provided with a binder before the covering is applied.

Foils of thermoplastic material may be used to the surface of the board under the influence of heat and pressure in a manner known per se.

In addition to, or instead of, the pre-stress generated by controlling the peripheral speed of the rolls, a pre-stress may be generated by controlling the moisture content of the board and/or the paper webs or films. For example, if moist paper is used for covering the board, after completion of the board and an exchange of moisture with the interior regions of the board, the paper will compress, thereby creating a pre-stress which is beneficial to the strength of the composite article.

The invention also relates to an apparatus for carrying out the method described. The apparatus comprises a known per se extruder with one or more chambers having walls to which heat can be applied. These walls may be heated by means of steam or hot water piping, electric resistance heating, induction heating, or otherwise. The chamber may be flared outwardly at the top for the introduction of the moistened wood chips. Fitting the upper portion of the chamber is a ram or piston, which is movable up and down, for example, by means of a crank shaft.

Immediately following the extruder, there are disposed two compression rolls, the axes of which extend parallel to the outlet slit of the extruder. The shafts of these compression rolls may be fixedly mounted or held together by spring means. Nozzles or like means may be provided before the compression rolls for moistening the surface of the board.

The two compression rolls may be equipped with known per se heating means. They may also be positively driven by means of electric motors, so that their peripheral speed becomes higher or lower than the rate of advance of the board.

Following the compression rolls, there may be provided one or more additional pairs of rolls, while on opposite sides of the board, two or more rolls may be surrounded by an endless steel band. These pairs of rolls may be equipped with heating means and may be driven by special drive means. Instead of the pairs of rolls, plate-shaped compression members may be provided following the compression rolls, such members being either stationary or adapted to be set in vibration. The vibratory motion may be perpendicular to the surfaces of the board or parallel thereto. The plate-shaped compression means may be equipped with heating means.

If it is desired to make board which is preferably covered on both faces with paper webs or films, the apparatus according to the present invention may comprise one or two rolls from which paper webs or foils are run between the surfaces of the board and the compression rolls. Disposed above these parts, there may be provided means for applying a binder or water to the surfaces of the board and/or paper webs or films. For this purpose, I may suitably employ rows of spray pipes.

FIG. 3 illustrates, diagrammatically and merely by way of example an embodiment of the apparatus according to the present invention.

Chips 17, moistened by means of a binder, fall through the flared-out portion 1 into the extruder 2, the walls of the latter being heated by means of steam pipes 3. A ram or piston 4 is moved up and down, compresses the chips, and moves the board 5 downwardly as it is formed.

The board 5 issuing from the extruder passes between a plurality of spray pipes 6, through which an adhesive solution is sprayed into its surfaces. Two paper webs 8 are run off rolls 7 and are secured to both faces of the board 5 by means of compression rolls 9. The compression rolls 9 densify the surface regions of the board and at the same time force the paper into the surface of the board.

After leaving the compression rolls 9 the board 5 passes between two radiant heaters 10 and then between pairs of rollers 11, which on both sides of the board are surrounded by an endless steel band 12.

FIG. 4 illustrates diagrammatically, and on a larger scale than in FIG. 3, a portion of the extruder in an embodiment with which exceedingly good results are obtained. As will be seen from FIG. 4, the walls 2 of the extruder, as seen from top to bottom, are initially spaced a distance $a_1$ from each other, and are then off-set inwardly, at 18, to be spaced a smaller distance $a_2$. The ram 4 fits between those portions of the walls spaced a distance $a_2$ from each other. Assuming that the space of the width $a_2$ is already filled with compressed chips, further chips will fall into the space of the width $a_1$. The reciprocating ram 4 causes the chips to be oriented so that the longitudinal direction of the chips is perpendicular to the direction of extrusion. The chips located under the central part of the ram enter the space having the width $a_2$ in the position mentioned. The chips moving downwardly along the walls of the widened portion of the space are re-oriented or bent when they reach the restructed portion of the space, so that these chips become at least partly oriented the direction of extrusion, in which position they are densified.

A modification of the embodiment of FIG. 4 is illustrated in FIG. 5. In it, the walls 2, again viewed from the top downwardly, are initially spaced a smaller distance $a_2$ to fit the ram 4, and subsequently a larger distance $a_1$, and then again the smaller distance $a_2$. The chips which have been pressed through the first narrower portion of the space have an opportunity in the wider portion of the spaced to spread out laterally somewhat. When the second narrower portion is reached, the outermost chips are again re-oriented or bent as described above. This embodiment is advantageous for some kinds of chips.

It will be understood that the extruders illustrated in FIGS. 4 and 5 may or may not be heated in the manner as described with reference to FIG. 3. Also, all apparatus shown in FIG. 3 under the extruder may be applied, entirely or in part, to the extruders described with reference to FIGS. 4 and 5.

I claim:

1. A method of forming particled board of wood chips or like material chips comprising the steps of forming a uniform mixture of the chips and a binder, compacting the chip and binder mixture and extruding the compacted mixture as a board, and during the compacting and extruding of the chip and binder mixture changing the orientation of the chips disposed along face surfaces of the board from a normal position transversely of the length of the board to a position extending parallel to the face surfaces and to the length of the board.

2. The method of claim 1 together with the step of packing the chips along the face surfaces of the board to be more densely packed than the chips disposed in the interior of the board.

3. The method of claim 1 wherein in the flow of the chips during the compacting and the extruding of the chips, the chips disposed along the face surfaces of the board are momentarily freed to permit the realignment thereof parallel to the direction of the board extrusion.

4. A method of making particled board according to claim 1 together with the step of transversely compressing the board by passing the board between a pair of compression rolls immediately after the board has been extruded and prior to the setting of the binder.

5. A method of making particled board according to claim 1 together with the heating of the board, while the binder is still in the unset condition, in a direction substantially perpendicular to the surfaces of the board, and then allowing the binder to set.

6. A method according to claim 4, characterized in that the board is moistened before the rolling treatment.

7. A method according to claim 4, characterized in that the board is passed between at least one additional pair of rolls immediately after leaving said compression rolls.

8. A method according to claim 7, characterized in that at least two rolls are used on each side of the board, said rolls being surrounded by an endless steel band.

9. A method according to claim 4 together with the added step of compressing the board by passing the board between plate-shaped, selectively stationary or vibrating, compression members.

10. A method according to claim 7 characterized in that certain of said rolls are heated.

11. A method according to claim 4, characterized in that the certain of the rolls are positively driven.

12. A method according to claim 11, characterized in that the rolls are driven at a peripheral speed different from the rate of advance of the board.

13. A method according to claim 4 for making board wherein facing layers are applied by means of the compression rolls.

14. A method according to claim 13, characterized in that the surfaces of the facing layers to be connected to the board, and the surfaces of the board are selectively provided with a binder prior to the application of the facing layers.

15. A method according to claim 13, characterized in that the facing layers are films of thermoplastic material fused to the board by means of a thermal treatment.

16. A method according to claim 13, characterized in that the moisture content of the board and the facing layers is so adjusted that the facing layers, after cooling and after an exchange of moisture, are under a pre-tension.

References Cited

UNITED STATES PATENTS

| 3,011,938 | 12/1961 | Chapman | 156—62.2X |
| 3,021,244 | 2/1962 | Meiler | 156—62.2 |
| 3,297,603 | 1/1967 | Mase | 156—62.2X |
| 3,300,361 | 1/1967 | Brown | 156—62.2X |
| 3,391,233 | 7/1968 | Polovtseff | 156—62.2X |
| 3,428,505 | 2/1969 | Siempelkamp | 156—62.2 |
| 3,440,189 | 4/1969 | Sharp | 156—62.2X |

BENJAMIN R. PADGETT, Primary Examiner

S. J. LECHERT, Jr., Assistant Examiner

U.S. Cl. X.R.

156—73, 244, 281, 309; 161—60, 164, 270; 264—176